US009832252B2

(12) United States Patent
Sylvain

(10) Patent No.: US 9,832,252 B2
(45) Date of Patent: Nov. 28, 2017

(54) SYSTEMS, METHODS, AND COMPUTER PROGRAM PRODUCTS FOR THIRD PARTY AUTHENTICATION IN COMMUNICATION SERVICES

(71) Applicant: Genband US LLC, Frisco, TX (US)

(72) Inventor: Dany Sylvain, Gatineau (CA)

(73) Assignee: Genband US LLC, Frisco, TX (US)

( * ) Notice: Subject to any disclaimer, the term of this patent is extended or adjusted under 35 U.S.C. 154(b) by 0 days.

(21) Appl. No.: 14/227,869

(22) Filed: Mar. 27, 2014

(65) Prior Publication Data

US 2015/0281234 A1 Oct. 1, 2015

(51) Int. Cl.
H04L 29/06 (2006.01)
H04L 29/08 (2006.01)
G06F 21/31 (2013.01)

(52) U.S. Cl.
CPC .............. *H04L 67/02* (2013.01); *G06F 21/31* (2013.01); *H04L 63/0428* (2013.01); *H04L 63/061* (2013.01); *H04L 63/0815* (2013.01); *H04L 63/20* (2013.01)

(58) Field of Classification Search
CPC . H04L 63/0884; H04L 63/0428; H04L 63/20; H04L 65/1003; H04L 65/1006; H04L 65/1009; H04L 67/02; G06F 21/31; G06F 21/41
See application file for complete search history.

(56) References Cited

U.S. PATENT DOCUMENTS

| 6,324,279 | B1 * | 11/2001 | Kalmanek et al. ........... 379/229 |
| 6,757,290 | B1 * | 6/2004 | Kalmanek et al. ........... 370/401 |
| 8,644,823 | B2 * | 2/2014 | Rozinov .................... 455/435.1 |
| 8,667,579 | B2 | 3/2014 | Leeder |
| 2006/0010321 | A1 * | 1/2006 | Nakamura et al. ........... 713/168 |
| 2008/0120425 | A1 * | 5/2008 | Beyer et al. .................. 709/230 |
| 2008/0133761 | A1 * | 6/2008 | Polk .............................. 709/228 |
| 2009/0164639 | A1 | 6/2009 | Sylvain |
| 2009/0164645 | A1 | 6/2009 | Sylvain |
| 2009/0234874 | A1 | 9/2009 | Sylvain |
| 2010/0138899 | A1 * | 6/2010 | Yamamoto .............. G06F 21/31 726/3 |
| 2010/0142517 | A1 * | 6/2010 | Montemurro et al. ....... 370/352 |

(Continued)

OTHER PUBLICATIONS

C. Rigney et al. "RFC 2865: Remote Authentication Dial in User Service (RADIUS)" © 2000 The Internet Society (76 pages) https://tools.ietf.org/pdf/rfc2865.pdf.*

(Continued)

*Primary Examiner* — Joseph P Hirl
*Assistant Examiner* — Thomas Gyorfi
(74) *Attorney, Agent, or Firm* — Haynes and Boone, LLP

(57) ABSTRACT

A method includes receiving a request from a first user at a first device to set up a communication session with a second user at a second device, in response to the request, directing the first device to authenticate the first user with a third party authentication service, receiving an authentication result corresponding to the first user, verifying the authentication result using information from the third party authentication service, and in response to verifying the authentication result, establishing the communication session on behalf of the first user.

20 Claims, 5 Drawing Sheets

(56) References Cited

U.S. PATENT DOCUMENTS

| | | | | |
|---|---|---|---|---|
| 2011/0119735 A1* | 5/2011 | Higuchi | ............... | H04L 63/08 |
| | | | | 726/3 |
| 2011/0265172 A1* | 10/2011 | Sharma | ............... | H04L 63/0815 |
| | | | | 726/8 |
| 2011/0296489 A1* | 12/2011 | Fernandez Alonso | .. | H04L 63/08 |
| | | | | 726/1 |
| 2012/0144464 A1* | 6/2012 | Fakhrai | ............... | G06F 21/41 |
| | | | | 726/6 |
| 2013/0219476 A1* | 8/2013 | Lin | ............... | H04L 9/321 |
| | | | | 726/4 |

OTHER PUBLICATIONS

J. Rosenberg et al. "RFC 3261: SIP: Session Initiation Protocol" © 2002 The Internet Society (269 pages) https://tools.ietf.org/pdf/rfc3261.pdf.*
B. Aboba et al. "RFC 3748: Extensible Authentication Protocol (EAP) Key Management Framework" © 2008 The IETF Trust (79 pages) https://tools.ietf.org/pdf/rfc5247.pdf.*
V. Hilt et al. "A Framework for Session Initiation Protocol (SIP) Session Policies" © 2008 The IETF Trust (35 pages) https://tools.ietf.org/pdf/draft-ietf-sip-session-policy-framework-05.pdf.*
J. Rosenberg et al. "RFC3261: SIP: Session Initiation Protocol" © 2002 The Internet Society (269 pages) https://www.ietf.org/rfc/rfc3261.txt.*
"OpenID Authentication 2.0—Final" Published Dec. 5, 2007 (22 pages) http://openid.net/specs/openid-authentication-2_0.html.*
Wikipedia.Org, "WebRTC", http://en.wikipedia.ori/wiki/Webrtc, Jan. 6, 2014, 3 pgs.
Wikipedia.Org, "OpenID", http://en.wikipedia.org/wiki/Openid, Jan. 6, 2014, 12 pgs.

* cited by examiner

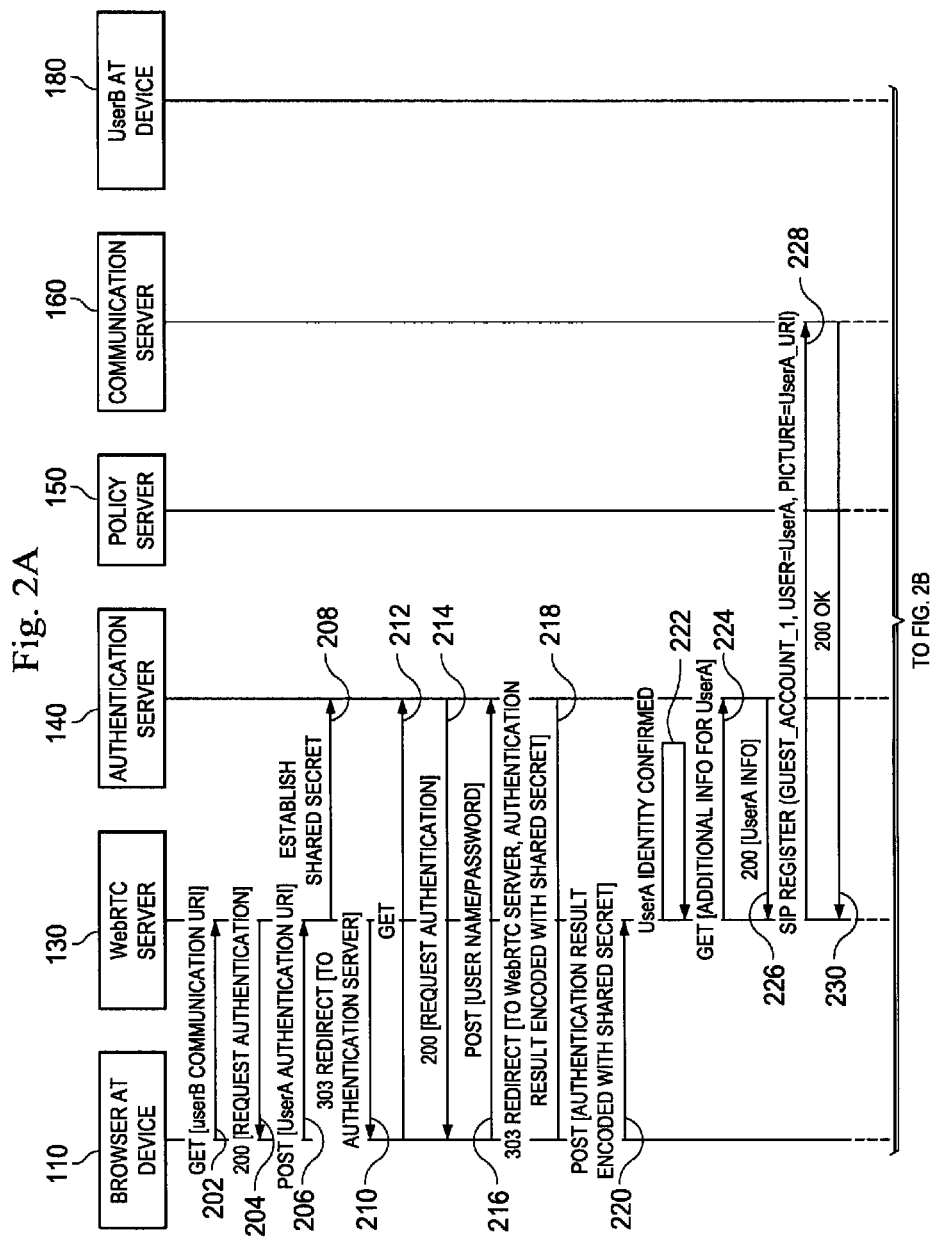

SYSTEMS, METHODS, AND COMPUTER PROGRAM PRODUCTS FOR THIRD PARTY AUTHENTICATION IN COMMUNICATION SERVICES

TECHNICAL FIELD

The present description relates, in general, to communication systems and, more specifically, to techniques for third party authentication of users of communication systems.

BACKGROUND

WebRTC (Web Real Time Communication) is a project by the World Wide Web Consortium (W3C) to define a set of Application Programming Interfaces (APIs) to enable browser-to-browser and browser-to-device applications for voice, video, and text. In one example, a user at a web browser is at an e-commerce site and contemplating making a purchase. There is a link on a page of the e-commerce site that indicates that the user can talk to a representative to ask questions or place an order. The user selects the link, which includes a Uniform Resource Identifier (URI) directing the browser to a communication address of the e-commerce retailer. When the user selects the link, a WebRTC client at the user's browser sets up a call with a call center identified by the URI. The user and a customer service representative then have a call (e.g., voice, video, and/or text) via WebRTC.

In the above scenario, there is some asymmetry of information in that the user knows he is reaching out to the e-commerce retailer (or, rather, a call center subcontractor of the retailer), but the call center does not necessarily know who the user is. Such scenario is not generally undesirable for a call center because a call center may welcome calls from the public in an effort to improve the customer experiences of users. However, an individual callee may not welcome unidentified callers. WebRTC does not currently offer a satisfactory technique for authenticating callers using a URI to initiate a call. Furthermore, WebRTC does not currently offer techniques for defining call policies on behalf of callees.

BRIEF DESCRIPTION OF THE DRAWINGS

The present disclosure is best understood from the following detailed description when read with the accompanying figures.

FIGS. 2A and 2B are a signal diagram illustrating an example exchange of messages among the devices of FIG. 1, according to one embodiment.

SUMMARY

Figure 1:
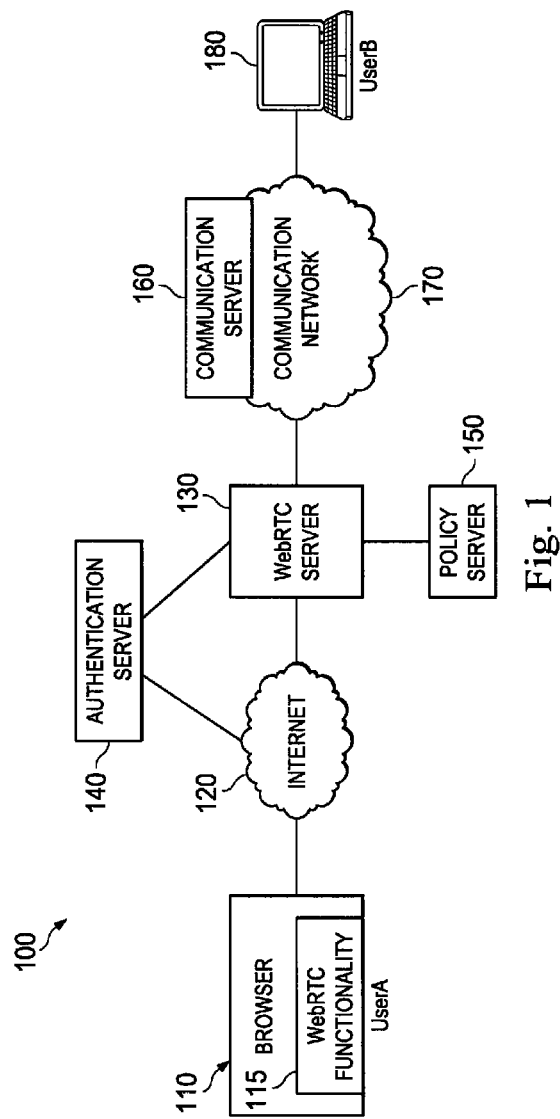
FIG. 1 illustrates an example network architecture in which embodiments may be incorporated

According to one embodiment, a method is disclosed that includes receiving a request from a first user at a first device to set up a communication session with a second user at a second device, in response to the request, directing the first device to authenticate the first user with a third party authentication service, receiving an authentication result corresponding to the first user, verifying the authentication result using information from the third party authentication service, and in response to verifying the authentication result, establishing the communication session on behalf of the first user According to another embodiment, a system is disclosed that includes a network server configured to communicatively couple a first network device to a second network device, the network server including: a processor configured to: redirect the first network device to a third party authentication service in response to a request by the first network device to establish a communication session, authenticate a user of the first network device by verifying information returned by the third party information service, and establish the communication session between the first and second network devices in response to authenticating the user of the first network device.

According to another embodiment, a computer program product is disclosed having a computer readable medium tangibly recording computer program logic for establishing a call between a first user and a second user, the computer program product including: code to receive a message from the first user requesting establishment of a call with a second user, code to direct the first user to a third party authenticator before establishing the call, code to verify an identity of the first user according to an authentication process of the third party authenticator, and code to establish the call in response to verifying the identity.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various embodiments allow for a user of a communication service to be authenticated by a third party before the communication session is established. In one example, an embodiment enables a guest web user using a WebRTC client to initiate a communication session with a carrier user and to be authenticated via a third party authentication service. Such feature may allow a callee to accept calls with confidence by being assured of the identity of the caller.

The introduction of WebRTC as a communication solution allows for the creation of new usage models for communication services. One new usage model includes the ability of a web user to initiate communication with a carrier user (e.g., a landline or cellular user) via a web client. In this model, the guest user (web user) can simply access a URI pointing to a specific carrier communication ID (e.g., phone number, SIP user ID) to open a web client and initiate a communication session with that communication ID. However, currently there is no immediate way to easily authenticate that guest user as that user may not have any valid credentials available to the carrier providing service to the communication ID user.

Thus, various embodiments described in more detail below allow the guest user to be indirectly authenticated by an existing third party authentication service. Examples of third party authentication services include, but are not limited to, OAuth and OpenID (available from the OpenID Foundation). Since many popular Internet service providers support such authentication methods, it is possible to acquire credentials for the guest user by requesting that guest user to authenticate using one of those authentication services.

Continuing with the example, the guest web user mentioned above initiates the communication by accessing a URI received for a communication network user (e.g., via email or social network). Accessing the URI opens a web client via the guest user's browser. The guest user is asked to authenticate himself via of one several authentication services where the web user has already some established identity. For instance, a service node in the network may already have a relationship with one or more third party authenticators, and it may communicate information identifying those third party authenticators to the web client. The web client displays a choice of third party authenticators to the guest user on a user interface, where the user may select a particular third party authenticator.

The service node redirects the web client to the selected third party authenticator, where the guest web user enters identifying information according to the requirements of the authenticator. In the background, the service node itself may access third party authenticators to, e.g., establish a shared secret for encryption.

Once the guest user is identified via the third party authenticator, the service node allows the guest web user to use a guest communication account provided by the service node. The service node then initiates a communication session with the communication network user. Certain identifying information retrieved from the authentication service (e.g. user name, nickname, photo, address, etc.) is associated temporarily with the guest communication account and presented to the callee communication network user to recognize the caller and decide if he wants to accept the communication session.

Authenticating the caller can provide the system with flexibility in call handling. For instance, with the caller identified, user or system policies can be applied to filter incoming requests: specifically who is allowed to "call in" and what services that caller is allowed (e.g. voice only, text only, location sharing, etc.). The addition of policies to authenticated calls is described in more detail below.

The scope of embodiments is not limited to any particular type of communication. For instance, various embodiments may be applied to voice communication, instant messaging, multimedia video conferences, file sharing, and the like. Further, while the examples below focus on a Session Initiation Protocol (SIP) embodiment, any appropriate communication protocol can be used in various embodiments. Moreover, the examples below assume use of WebRTC as the communication protocol; however, the scope of embodiments can be applied to any communication protocol that allows a user on one network to initiate real-time communications with a user on a different network. For example, a browser or web-enabled application can be extended via media handling plugins, get access to media input/output on the device running the browser and transport it over any type of bearer, as long as the other end of the call has a compatible implementation.

FIG. 1 illustrates an example network architecture 100 in which embodiments may be incorporated. The network architecture 100 includes network device 110, which is associated with user A in this example. Network device 110 may include any appropriate type of device, such as a laptop computer, desktop computer, smartphone, tablet, or the like. In this example, user device 110 runs a web browser that includes WebRTC functionality 115.

Device 110 communicates over network 120 with WebRTC server 130 (a type of service node) and authentication server 140. Although network 120 is shown as the Internet, it is understood that various embodiments may communicate across any appropriate network. For example, device 110 may communicate via a Local Area Network (LAN), Wide Area Network (WAN), cellular network, or other network to reach servers 130 and 140.

The various servers 130, 140, 150, and 160 of FIG. 1 are shown as single boxes for ease of illustration herein. However, the concept of a server in FIG. 1 may include more than one server, so for instance, authentication server 140 may represent a single server computer or multiple server computers working together to authenticate user A. The same is true for servers 130, 150, 160—a single box can represent one or more servers. Various embodiments may include any appropriate hardware to act as a server, such as a general purpose computer running an operating system such as Linux.

Authentication server 140 represents server capabilities at a third party authenticator. Authentication server 140 can communicate with both user device 110 and WebRTC server 130. In some examples, the third party authenticator is not controlled by user A and is an independent entity available over network 120. Thus, communication server 160 assumes that it can trust the authentication provided by authentication server 140. As noted above, examples of a third party authenticator include OpenID and OAuth, though other proprietary authenticators are within the scope of embodiments. For instance, authentication provided by social media sites or web services (e.g., those provided under the names Facebook™ or Yahoo!™) or any other network-accessible and trusted sources may be used.

WebRTC server 130 is in communication with authentication server 140 and user device 110. WebRTC server 130 can provide communication between user device 110 (on a first network) and the device 180 of user B (on another network). In the example of FIG. 1, WebRTC server 130 includes APIs that can communicate with both WebRTC functionality 115 and communication server 160 on network 170, thereby allowing voice, data, and messages to traverse the disparate networks 120 and 170. Server 130 can be used to provide services to multiple "B users" which can be all in the same network or in different networks (i.e. WebRTC server could connect to multiple 160/170.

Communication server 160 is at network 170. Examples of network 170 include a private enterprise network, a LAN, or a carrier network (e.g., the PSTN or a cellular network). The example of FIG. 1 assumes that the network 170 is a carrier network. Communication server 170 acts a gateway for user B by receiving communications over the first network 120 (e.g., an Internet Protocol—IP—network) and converting signaling and data to conform to the carrier's network 170. Communication server 170 communicates with WebRTC server 130 to set up the call and to maintain the call.

Device 180 is a device used by user B to communicate over the communication network 170. Examples of devices that can be used by user B include a phone, laptop computer, a smartphone, a desktop computer, a tablet, and the like.

Policy server 150 is in communication with WebRTC server. Although not shown in FIG. 1, policy server 150 may be in communication with WebRTC server over network 120 or over any other appropriate network (the same is true for server 140 as well). In some examples, both policy server 150 and authentication server 140 are web servers that communicate with WebRTC server using HTTP. However, other embodiments may use different protocols. Policy server 150 stores policy information on behalf of user B so that those policies can be applied to incoming calls by WebRTC server 130.

In an example use case, user A desired to make a call to user B. User A has an open browser that is WebRTC enabled so that the WebRTC functionality 115 provides an interface for initiating the call. For instance, user A may have a message with an HTTP link, where clicking on the link causes functionality 115 to attempt to establish the call. Functionality 115 communicates over network 120 with WebRTC server 130 to set up the call. WebRTC server 130 redirects device 110 to authenticate user A with authentication server 140. After user A authenticates himself, functionality 115 passes authentication information (e.g., encrypted identity data) to the WebRTC server 130.

WebRTC server 130 confirms the identity of user A by, e.g., decrypting the authentication information with a key from the third party authenticator. Once user A is authenticated and identified, WebRTC server 130 allows user A to use a guest account, and WebRTC server establishes the call with user B via communication server 160. In some examples, WebRTC server 130 passes identity information of user A on to communication server 160 so that communication server 160 can present the identity information to user B before user B accepts or declines the call.

Additionally, when user A is identified, various policies can be applied by WebRTC server as the call is set up. For instance, WebRTC server 130 can query policy server 150 with the identity information of user A to access any policy information applicable to calls from user A. If the query results in applicable policy information returned from policy server 150, WebRTC server 130 can apply those policies when setting up the call. Examples of polices include, e.g., instructions on behalf of user B that specify who is allowed to "call in" and what services that caller is allowed (e.g. voice only, text only, location sharing, etc.). Various embodiments are not limited to any particular set of policies, and any appropriate policies may be adopted in various embodiments.

Figure 2B:
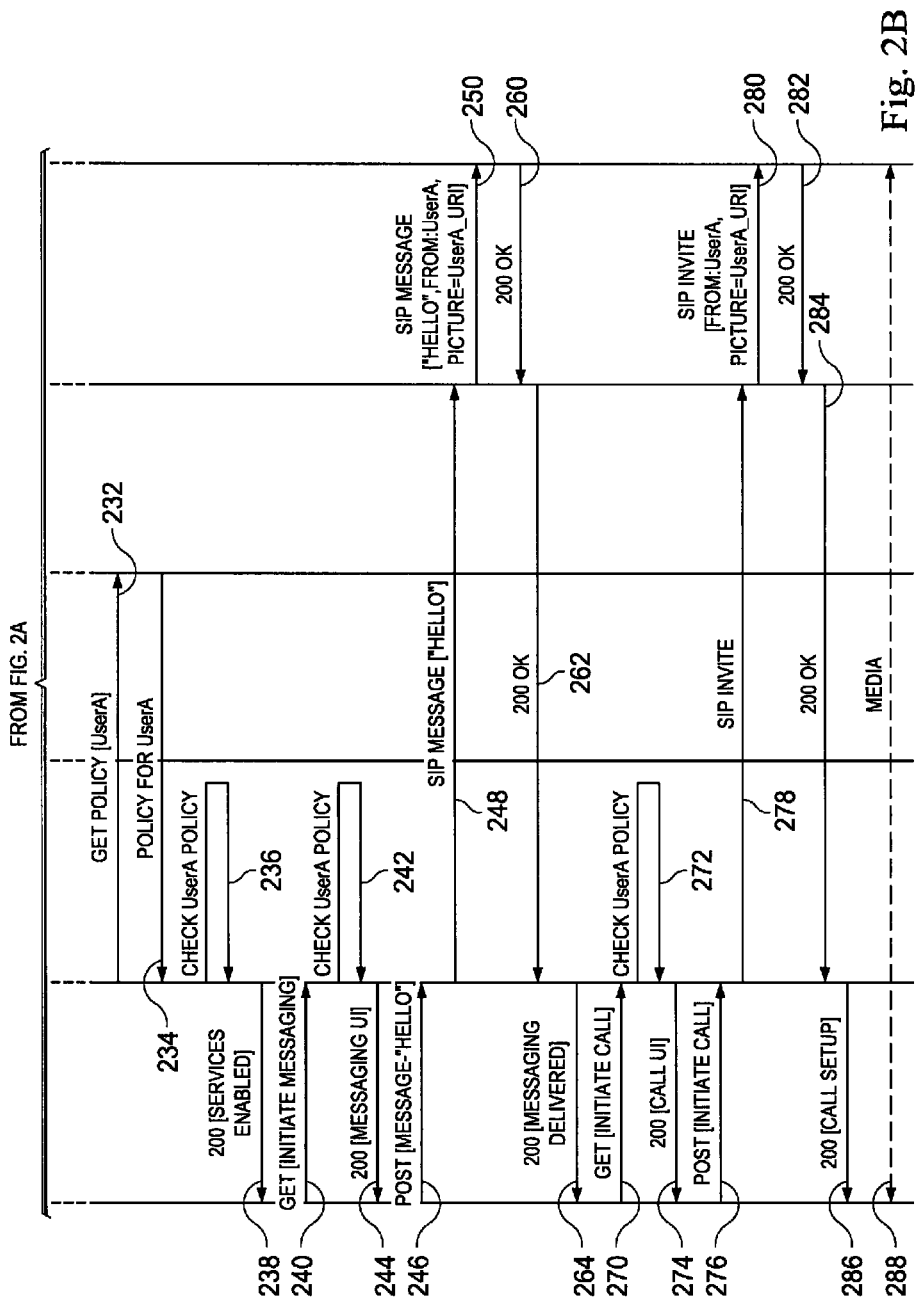

FIGS. 2A and 2B are referred to collectively as FIG. 2 herein. FIG. 2 is a signal diagram illustrating an example exchange of messages among the devices of FIG. 1, according to one embodiment. The example call flow starts out with a user A clicking on (or otherwise selecting) a URI that links to user B and is intended to initiate a call to user B. The communication among the various devices of FIG. 1 in this example is performed according to HTTP, except for the SIP messages described below. Also, once communication is set up, voice and video may be sent using, e.g., Real-time Transport Protocol (RTP) or other protocol. File sharing may be performed using, e.g., File Transport Protocol (FTP) or other protocol.

Message 202 is a communication to server 130 established by user A selecting the link. Server 130 recognizes the communication as an attempt to establish a call to user B, and server 130 sends message 204 to user A requesting that user A identify himself Message 204 in this example includes a web page displayed to user A on browser 110 to ask user A to select a method of authentication, from a choice of third party authenticators. It should be noted that, although FIG. 1 shows only one authenticator, various embodiments may work with multiple authenticators and multiple servers 140.

At message 206, the user enters or selects the preferred third party authenticators and indicates to the web page that the information should be sent to server 130 (e.g., by clicking an ENTER button).

At message 208, server 130 establishes a shared secret with authentication server 140. For instance, the shared secret may include an encryption key for server 140 to use when issuing authorization information to user A. Server 130 can then use that shared secret to decrypt authentication information from user A, which is described further below.

At message 210, server 130 redirects user A to the selected authentication provider at server 140 by, e.g., redirection with message 210 that points to server 140. User A's browser at device 110 consequently sends message 212 to server 140. Server 140 (at the third party authenticator) starts the authentication process by sending message 214 to the browser at device 210 to request that user A authenticates himself with the authentication service at server 140 by providing a user ID and password or other credentials. User A provides those credentials at message 216, While the examples herein describe the use of user IDs and passwords, any appropriate type of identifying credential (e.g., bioinformatics, security cards, etc.) can be used in other embodiments.

Server 140 then uses the provided credentials to either authenticate user A or refuse to authenticate user A. In a scenario in which server 140 refuses to authenticate user A, it may be a result of credentials that do not match a previously-established account at the third party authenticator. In such a case, the third party authenticator may ask user A to re-enter valid credentials, ask user A to establish an account, or simply refuse authentication. The example of FIG. 2 assumes that user A is in possession of valid credentials and enters those credentials correctly.

Continuing with the actions of server 140, server 140 examines the credentials provided by user A to ensure validity and a match to a known user identity. For example, user A may already have set up a user account with the third party authenticator that stores a screen name and/or a real name of user A, contact information such as an email address or phone number, an image or avatar associated with user A, and/or the like. In this example, server 140 does authenticate user A with an established identity.

In response to authenticating user A, server 140 sends message 218 to the browser at device 110, which redirects the browser to the server 130. Message 218 also includes an authentication result that is encoded using the shared secret. For instance, the authentication result may include simple message that is a YES or a NO. In other embodiments, the authentication result may include identity data from the account of user A, such as real name, screen name, avatar or photo, etc.

In response to the redirection, the browser at device 110 passes the encoded authentication result to server 130. At action 222, server 130 internally decrypts the authentication result using the shared secret, thereby identifying and authenticating user A.

Server 130 may request further information from authentication server 140 using message 224. For example, if the encrypted authentication result omits some useful information (e.g., real name, screen name, avatar or photo, current location, previous social media posts, and/or the like), server 130 may use message 224 to request further information. An advantage of some embodiments is that server 130 can provide user A identity information to communication server 160 so that user B can recognize user A from the identity information before deciding to accept the call. In the embodiment of FIG. 2, such identifying information can be provided to server 130 at message 220 or 226. In any event, various embodiments provide a level of authentication and types of identity information that enable user B to make a choice to answer a call based at least in part on user A's identity. Furthermore, and as described in more detail below, user A's identity information can be used in the application of policies to the call.

In this example, user A is not a registered user of communication network 170. However, user A has been authenticated by a trusted third party. In response to the authentication of an otherwise unregistered user, server 130 then allows user A to use a guest account to make the call to user B. Server 130 sends message 228 to communication server 160 as a SIP Register message. In this example, message 228 includes at least some of the information that was received in messages 220 and/or 226. Such information may include any information that would be useful to user B in identifying user A (e.g., real name, screen name, avatar or photo, current location, previous social media posts, and/or the like). Thus, in one example, message 228 includes a picture of user A and user A's screen name.

Continuing with the example, server 160 acknowledges the SIP Register message 228 at message 230. Server 130 then sends message 232 to policy server 150 to request policy information to apply to the call. The present example assumes that user B has set policies and stored those policies in policy server 150 at a previous time and also that at least one of those set polices applies to user A. Various embodiments include a policy entity, which may be same or different from an entity managing network 170, which allows users of communication network 170 to set policies of use. In this example, the policies may specify usage restrictions for incoming calls to user B. User B may set any appropriate usage policies including, but not limited to, allowed callers, type of service (messaging, voice video) allowed for a caller, whether location sharing is allowed, etc. Some policies may be policies that apply to all calls as a default, whereas other policies may apply to specific callers only. In this example, at least some policies are defined with respect to specific user identities, queriable with respect to user identities, and applied to specific users on a user-by-user basis after users are identified.

In the embodiment of FIGS. 1 and 2, server 130 requests policy information from server 150; server 150 then uses the identity of user A to identify policies applying to user A and send corresponding policy information to server 130 in message 234. At actions 236 and 242, server 130 applies those usage policies to the communication session in accordance with the policy information. At action 236, server 130 checks the received policy information to determine whether calls from user A are allowed. Assuming that the policy information does not prohibit calls from user A, server 130 sends message 238 to browser at device 110 indicating that communication services are enabled. User A may then request instant messaging at message 240. Server 130 once again checks the policy information to determine whether messaging is allowed from user A to user B and, finding in the affirmative, provides an instant messaging User Interface (UI) for user A at message 244.

User A interacts with the messaging UI to enter "hello" therein and send the textual data to server 130 at message 246. Server 130 generates and sends SIP message 248 to communication server 160. Communication server 160 generates SIP message 250, including inserting user A picture information therein, and sends SIP message 250 to device 180 that is used by user B. At that point, user device 180 may display upon its display device the picture of user A and the instant messaging text "hello". Delivery of the instant message is acknowledged at messages 260, 262, and 264.

Having sent the instant message, user A now desires to establish a voice call with user B. User A then interacts with the UI on his browser to indicate the establishment of a voice call at message 270. At action 272, server 130 checks the policy information to determine whether voice calls from user A to user B are allowed, and finding in the affirmative, server 130 presents voice call UI at the browser via message 274.

User A selects within the UI an option to initiate the voice call and sends message 276. Server 130 receives message 276 and generates a SIP invite message 278, which it sends to communication server 160. Communication server 160 alerts device 180 of an incoming call, where user B can see in the incoming call notification the user A's screen name, and if device 180 is capable, displaying user A's picture. In this example, user B accepts the call, and the acceptance of the call is indicated to server by messages 282 and 284. Server 130 then sets up the call via message 286 to user A's browser. Devices 110 and 180 then exchange voice media at action 288 using, e.g., RTP.

The embodiments of FIGS. 1 and 2 are examples, and different embodiments may include different scenarios. For instance, other embodiments may include user B at a landline VOIP-enabled phone or a smartphone on a cellular network. In other embodiments, communication between the communication server 160 and device 180 may not use SIP but instead may use some other protocol such as H.248 or XMPP, as appropriate for the particular network 170.

Figure 3:
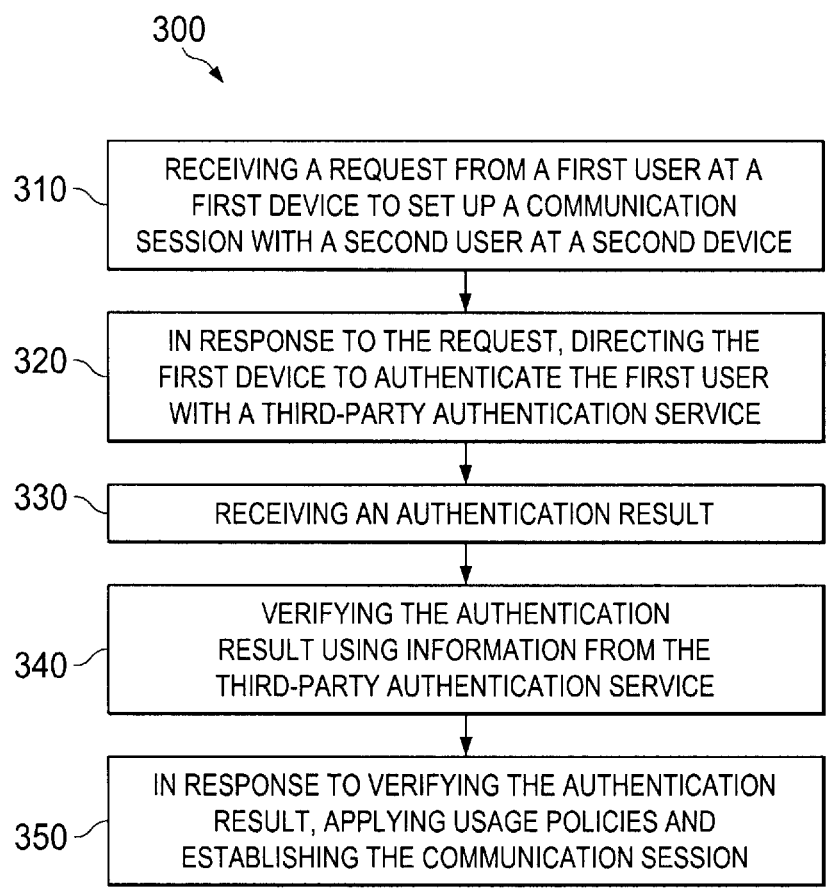
FIG. 3 is a simplified block diagram of an example method, adapted according to one embodiment.

FIG. 3 is a simplified block diagram of method 300, adapted according to one embodiment. Method 300 may be performed by a computer, such as WebRTC server 130 of FIG. 1. For instance, a computer may read executable code from a non-transitory medium and then execute the code to perform the actions described below.

At action 310, the server receives a request from a first device to set up a communication session with a second device. The first and second devices may be on different networks, as shown in FIG. 1, where one network may include an IP-based network and the other network where the callee resides is a carrier-owned network. Also, the first and second devices may be different types of devices (laptop computers, VOIP-enabled phones, smartphones, etc.).

In the example of FIG. 2, action 310 includes, among other things, the first user selecting a link that includes a URI directed to the second user. However, the scope of embodiments includes other techniques wherein the first user may initiate communication by, e.g., selecting an address from a directory, rather than selecting a link.

At action 320, the server directs the first device to authenticate itself with a third party authentication service. Action 320 is performed in response to receiving the request at action 310. In one example, the server has previously-established relationships with multiple third party authenticators, and the server provides a list of third party authenticators to the first user for the first user to choose. In other examples, action 320 includes an automatic redirection to a particular third party authenticator. For instance, if an address of the first user includes information indicating that the first user is a user of a given social network that also acts a third party authenticator, the server may simply redirect the user directly to the authentication server of the social network. The scope of embodiments includes any appropriate method to redirect a user's device to the authenticator.

At action 330, the server receives an authentication result. In the example embodiment of FIGS. 1 and 2, the server 130 receives the authentication result from the first user's device. However, other embodiments may include receiving the authentication result from somewhere else, such as from the third party authenticator itself.

In the embodiment of FIGS. 1 and 2, the authentication result includes encrypted data that is decrypted using a shared secret between the server and the third party authenticator. In such embodiments, encryption ensures that the device of the first user does not tamper with the data or send false data to the server. In fact, in the embodiments described above, the use of an independent third party authenticator may add a level of security by ensuring that the authentication result can be trusted.

At action 340, the server verifies the authentication result using information from the third party authentication service. In the example of FIGS. 1 and 2, the information from the third party authentication service may include a shared secret and/or an identification of the third party itself in the authentication results. The server decrypts the authentication result and then parses the decrypted result to, e.g. access information within the authentication result from the third party indicating an identity of the first user.

Once the user has been verified and identified, the server applies usage policies and establishes the communication session. As noted above, the identity of the user may be linked to one or more usage policies at a policy entity. The server can query the policy entity using the user identity and then apply policies accordingly. Also, the server may apply those policies when establishing the communication session, such as by restricting the first user to a type of media (e.g., instant message, voice, or video), to a time of day, and/or the like.

It should be noted that the disclosure is not limited to the specific embodiments shown above. For instance, other embodiments may include a communication session of any type, such as messaging, voice, video, file sharing, and the like.

Figure 4:
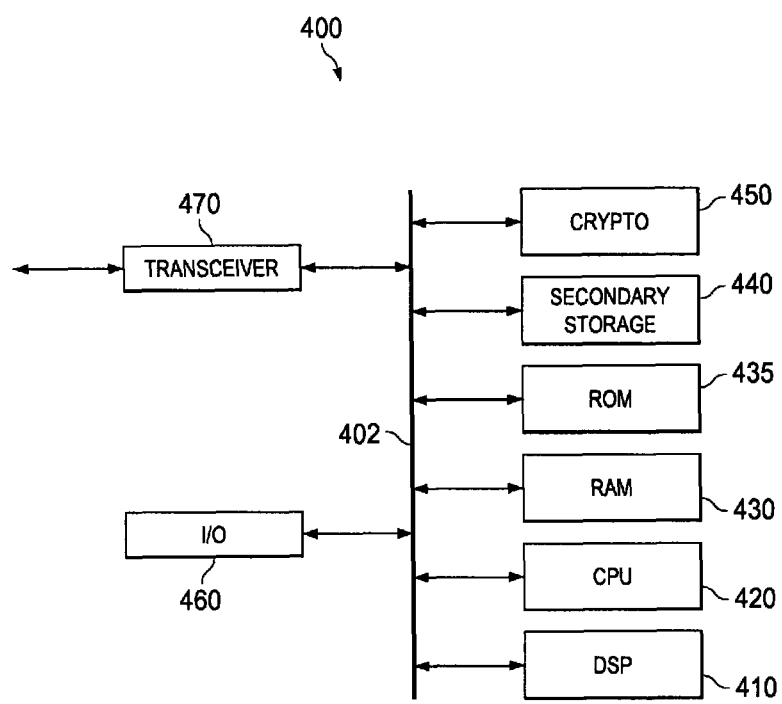
FIG. 4 illustrates an example computer system, adapted according to one embodiment.

FIG. 4 illustrates an example computer system 400 adapted according to one embodiment of the present disclosure. The computer system 400 includes an example system on which embodiments of the present disclosure may be implemented (such as server 130, authentication server 140, policy server 150, communications server 160, or user devices 110 and 180). The computer system 400 includes a digital signal processor (DSP) 410, a central processing unit (CPU), a random access memory (RAM) 430, a read-only memory (ROM) 435, secondary storage 440, encryption and decryption resources 450, input/output (I/O) devices 460, and a of transceivers 470, all of which may be communicatively coupled via a bus 402.

The CPU 420 may be implemented using hardware or a combination of hardware and software. Although illustrated as a single CPU, the CPU 420 is not so limited and may comprise multiple processors. The CPU 420 may be implemented as one or more processors, i.e., as one or more chips, cores (e.g., a multi-core processor), field-programmable gate arrays (FPGAs), and/or application specific integrated circuits (ASICs). Likewise, the DSP 410 may be implemented as more than one DSP chip. The DSP 410 may perform transcoding or transrating of a media stream or call flow received by a transceiver 470. Crypto resources 450 may include a hardware accelerator for performing security features such as encryption or authentication of a media stream or call flow received by transceiver 470.

The secondary storage 440 may comprise one or more disk drives or solid state drives and is used for non-volatile storage of data and as an over-flow data storage device if the RAM 430 is not large enough to hold all working data. The RAM 430 may be static RAM, dynamic RAM, or the like, and the ROM 435 may be programmable ROM (PROM), erasable PROM (EPROM), electrically EPROM (EEPROM), or the like. The secondary storage 440 may be used to store programs that are loaded into the RAM 430 when such programs are selected for execution. The ROM 435 is used to store instructions and perhaps data that are read during program execution. The ROM 435 is a non-volatile memory device that typically has a small memory capacity relative to the larger memory capacity of the secondary storage. The RAM 430 is used to store volatile data and perhaps to store instructions. Access to both the ROM 435 and the RAM 430 is typically faster than to the secondary storage 440.

The computer system 400 includes transceivers 470. There may be a transceiver 470 for each communication line (e.g., electrical or optical) coupled to the computer system 400. A transceiver 470 may be bidirectional or unidirectional, depending on the embodiment. Each transceiver 470 is adapted to couple computer system 400 to a communication link (e.g., a wired or wireless communication link). In the examples of FIGS. 1 and 2, transceivers 470 may couple a respective device to network 120 and/or to network 170.

The I/O devices 460 may include a keyboard, a computer mouse, a microphone, and/or a display device for allowing a user to provide input to and receive output from the computer system 400.

It is understood that by programming and/or loading executable instructions onto the computer system 400, at least one of the CPU 420, the RAM 430, and/or the secondary storage 440 are changed, transforming the computer system 400 in part into a particular machine or apparatus having the functionality taught by the present disclosure. The executable instructions may be stored on the RAM 430 or secondary storage 440 and loaded into the CPU 420 for execution. The device functionality described above with respect to FIGS. 1-3 may be implemented as a software application running on the CPU 420 and using the RAM 430, the ROM 435, and/or secondary storage 440. Specifically, for server 130, its functions described at FIG. 3 may be implemented as a software application running on the CPU 420.

Logic may be encoded in a non-transitory computer-readable medium, such as RAM 430 and/or secondary storage 440. Such a medium can take many forms, including but not limited to, non-volatile media and volatile media. In various implementations, non-volatile media includes optical or magnetic disks, such as secondary storage 440, and volatile media includes dynamic memory, such as various types of RAM 430. CPU 420 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method performed by a service node in a communication network, the method comprising:
   with the service node, receiving a request from a first user at a first device to set up a communication session with a second user at a second device;
   with the service node, in response to the request, sending a message to the first device, the message directing the first device to authenticate the first user with a third party authentication service, the message including a list of third party authentication services associated with nodes in the communication network other than the service node;
   with the service node, receiving from the first device, a response that indicates a selected third party authentication service from the list of third party authentication services;
   with the service node, in response to the response, establishing a shared secret with the selected third party authentication service, wherein the first user and first device do not have knowledge of the shared secret;
   with the service node, receiving from the first device an authentication result corresponding to the first user, the authentication result including the shared secret;
   with the service node, verifying the authentication result using information from the selected third party authentication service; and
   with the service node, in response to verifying the authentication result, establishing the communication session on behalf of the first user.

2. The method of claim 1, wherein verifying the authentication result includes confirming an identity of the first user, the method further comprising:
   after the first user's identity is confirmed, requesting policy information from a policy entity;
   receiving the policy information from the policy entity; and
   applying usage policies to the communication session in accordance with the policy information.

3. The method of claim 2, wherein the policy information includes usage requirements for communications with the first user.

4. The method of claim 2, wherein the usage requirements are set by the second user in advance of the communication session.

5. The method of claim 2, wherein the usage policies include at least one of:
   restrictions on types of media;
   restrictions on whether communication with specific users is allowed;
   restrictions in time where communication is allowed; and
   restrictions based on requested communication priority.

6. The method of claim 1, wherein the service node comprises a web server in communication with the first device and in communication with an authentication server of the authentication service, the method further comprising:
   establishing a shared secret with the authentication server; and
   verifying the authentication result using the shared secret.

7. The method of claim 1, wherein the authentication result is encrypted by the authentication service before being received from the first device.

8. The method of claim 7, wherein verifying the authentication result includes decrypting the authentication result.

9. The method of claim 1, wherein the service node comprises a web server, further wherein the web server and the first user communicate using Hypertext Transfer Protocol (HTTP).

10. The method of claim 9, wherein the second device participates in the communication session through a communication server that negotiates with the web server to establish the communication session.

11. A system comprising: a network server configured to communicatively couple a first network device to a second network device, the network server comprising:
    a processor configured to:
       send a message from the network server to the first network device in response to a request by the first network device to establish a communication session, the message comprising a list of third party authentication services associated with servers other than the network server;
       receive a response from the first network device, the response indicating a selected third party authentication from the list of third party authentication services, wherein the selected third party authentication service is not controlled by the first network device and is in communication with the first network device over the Internet;
       establish a shared secret with the selected third party authentication service in response to receiving the response wherein the first network device does not have knowledge of the shared secret;
       authenticate a user of the first network device by verifying information returned by the selected third party information service and information from the first network device that includes the shared secret; and
       establish the communication session between the first and second network devices in response to authenticating the user of the first network device.

12. The system of claim 11, wherein the network server has a pre-established relationship with the third party authentication service.

13. The system of claim 11, wherein the processor is further configured to:
    communicate with a policy entity to retrieve policy information defining policies of use with respect to the user of the first network device.

14. The system of claim 13, wherein processor is further configured to:
    applying the policies of use when establishing the communication session.

15. The system of claim 11, wherein the network server comprises a web server.

16. A computer program product having a non-transitory computer readable medium tangibly recording computer program logic for establishing a call between a first user and a second user, the computer program product comprising:
    code to receive a message at a service node, the message being from the first user requesting establishment of a call with a second user;
    code to send a message from the service node to the first user, the message directing the first user to a third party authenticator before establishing the call, the message comprising a list of third party authentication services associated with network nodes other than the service node;
    code to receive, from the first user, a response indicating a selected third party authentication service from the list of third party authentication services;

code to establish a shared secret with the selected third party authentication service in response to the response;

code to receive an authentication result from the first user, the authentication result including the shared secret, wherein the first user does not have knowledge of the shared secret;

code to verify an identity of the first user according to an authentication process of the selected third party authentication service; and code to establish the call in response to verifying the identity.

17. The computer program product of claim 16, wherein the call comprise at least one of:
   text media;
   video media; and
   voice media.

18. The computer program product of claim 16, further comprising:
   code to pass identity information of the first user to the second user as a part of a call set-up process.

19. The computer program product of claim 16, further comprising:
   code to request use policies from a policy server based on identity information of the first user; and
   code to apply received use policies as part of a call set-up process.

20. The computer program product of claim 16, wherein code to verify an identity comprises:
   code to receive an authentication result from the first user; and
   code to decrypt the authentication result using an encryption secret shared with the third party authenticator.

* * * * *